United States Patent
Stumpel

(10) Patent No.: US 11,564,783 B2
(45) Date of Patent: Jan. 31, 2023

(54) MODULAR SUPPORT FOR DENTAL PROSTHESIS

(71) Applicant: Lambert J. Stumpel, San Francisco, CA (US)

(72) Inventor: Lambert J. Stumpel, San Francisco, CA (US)

(*) Notice: Subject to any disclaimer, the term of this patent is extended or adjusted under 35 U.S.C. 154(b) by 979 days.

(21) Appl. No.: 16/271,573

(22) Filed: Feb. 8, 2019

(65) Prior Publication Data
US 2019/0254785 A1 Aug. 22, 2019

Related U.S. Application Data

(60) Provisional application No. 62/632,708, filed on Feb. 20, 2018.

(51) Int. Cl.
*A61C 13/00* (2006.01)
*A61C 8/00* (2006.01)

(52) U.S. Cl.
CPC .......... *A61C 13/0003* (2013.01); *A61C 8/005* (2013.01); *A61C 8/0048* (2013.01); *A61C 8/0095* (2013.01)

(58) Field of Classification Search
CPC ..... A61C 8/0009; A61C 8/0048; A61C 8/005; A61C 8/0095; A61C 13/0003; A61C 13/08; A61C 13/087; A61C 13/10; A61C 13/01–34
USPC .................................................. 606/300–306
See application file for complete search history.

(56) References Cited

U.S. PATENT DOCUMENTS

| | | | |
|---|---|---|---|
| 5,007,833 A * | 4/1991 | Barbone | A61C 8/0048 433/172 |
| 5,575,651 A | 11/1996 | Weissman | |
| 5,676,703 A * | 10/1997 | Gelbard | A61B 17/7032 606/267 |
| 6,692,254 B1 | 2/2004 | Kligerman et al. | |
| 7,021,934 B2 | 4/2006 | Aravena | |
| 8,920,171 B2 | 12/2014 | Nagni et al. | |
| 9,452,034 B1 | 9/2016 | Urquiola | |
| 2002/0142265 A1 | 10/2002 | Weissman | |

(Continued)

FOREIGN PATENT DOCUMENTS

EP   2 913 023 A1   9/2015
WO   WO 2008/157137 A1   12/2008

(Continued)

OTHER PUBLICATIONS

Trefoil™—*The next full-arch revolution*, online brochure, 2017, Nobel Biocare, retrieved Mar. 4, 2019 at www.nobelbiocare.com/international/en/home/products-and-solutions/treatment-concepts/trefoil.html.

*Primary Examiner* — Yogesh P Patel
(74) *Attorney, Agent, or Firm* — Santa Fe IP, LLC

(57) ABSTRACT

A modular support for dental prosthesis is configured for securement to abutments and respective dental implants. The modular support includes connectors releasably engaging respective abutments, collars surrounding respective connectors, vertically spaced planar wings extending from at least one collar substantially parallel to the occlusal plane, and a planar tab extending substantially parallel to the occlusal plane. One end of the planar tab extends between the pair of planar wings to provide an internal reinforcing framework for the dental prosthesis. A method of using the modular support for dental prosthesis is also disclosed.

20 Claims, 9 Drawing Sheets

(56) References Cited

U.S. PATENT DOCUMENTS

| | | |
|---|---|---|
| 2003/0064349 A1 | 4/2003 | Simmons, Jr. |
| 2003/0211444 A1 | 11/2003 | Andrews |
| 2008/0206709 A1 | 8/2008 | Lannan |
| 2009/0075235 A1* | 3/2009 | Letcher ............... A61C 8/0048 433/215 |
| 2011/0195379 A1 | 8/2011 | Allaire |
| 2012/0171639 A1 | 7/2012 | Berger |
| 2014/0051034 A1 | 2/2014 | Nagni et al. |
| 2014/0134566 A1 | 5/2014 | Lemke et al. |

FOREIGN PATENT DOCUMENTS

| | | |
|---|---|---|
| WO | WO 2012/076546 A1 | 6/2012 |
| WO | WO 2015/096899 A1 | 7/2015 |

* cited by examiner

MODULAR SUPPORT FOR DENTAL PROSTHESIS

CROSS-REFERENCES TO RELATED APPLICATIONS

This application claims priority to U.S. Provisional Patent Application No. 62/632,708 filed Feb. 20, 2018 and entitled MODULAR SUPPORT FOR DENTAL PROSTHESIS, the entire contents of which is incorporated herein for all purposes by this reference.

BACKGROUND OF INVENTION

Field of Invention

This application relates, in general, to a modular support for dental prosthesis and methods for their use.

Description of Related Art

Dental implants supporting dental prosthetics are well known. Making use of osseointegration, dental implants provide solid anchors in jawbones that can be used to provide support for dental prosthesis, whether for a single tooth replacement or for a multiple tooth prosthesis. In the case of multiple tooth prosthesis, such as a fixed bridge or a full-arch restoration, several dental implants are necessary to provide suitable support to withstand the masticatory forces subjected on the multiple tooth prosthesis.

Accordingly, multiple tooth prostheses require an internal framework to provide additional structural integrity to the prosthesis itself. For example, full-arch restorations generally include a rigid metal bar that is embedded within and extends through a significant portion of the restoration. Such framework can be a milled framework that is pre-manufactured, such as those provided by Nobel Biocare for their Trefoil™ systems. Or such framework can be custom fitted and cast for a specific patient's mouth, such as the prosthodontic frameworks described in U.S. Pat. No. 9,452,034 to Urquiola. In both cases, time-consuming production processes, namely, milling and custom casting, are generally expensive and time consuming leading to a more expensive product. Moreover, pre-manufactured framework is not suitable for pre-existing implants that do not specifically match the dimensions of the pre-manufactured framework. And custom casting requires multiple patient visits because such casting generally cannot be accomplished while a patient waits.

Framework assemblies for dental prostheses are also known. For example, U.S. Pat. No. 8,920,171 to Nagni et al. describes a modular framework suprastructure for dental implants, and U.S. Pat. No. 6,692,254 to Kligerman et al. describes an implant supported dental prosthesis foundation bar. While such framework assemblies may overcome some disadvantages of the above-mentioned time-consuming production processes, existing assemblies are not very compatible with implants that are misaligned. For example, it appears that Kligerman's foundation bar requires implants that are parallel to one another. And it appears that Nagni's framework requires implant connectors (aka abutments) that extend within parallel planes, if not parallel to one another.

In light of this, it would be useful to provide a modular support that overcome the above and other disadvantages of known dental prosthesis frameworks.

BRIEF SUMMARY

One aspect of the present invention is directed to a modular support for a dental prosthesis that is configured for securement to a plurality of abutments, each engaging a respective dental implant. The modular support includes a plurality of connectors, each connector releasably engaging a respective abutment, a plurality of collars, each collar including a bore extending substantially orthogonal to an occlusal plane, wherein each collar surrounds a respective connector positioned in its bore, a pair of vertically spaced planar wings extending from at least one collar substantially parallel to the occlusal plane, and a planar tab extending substantially parallel to the occlusal plane, wherein at least one end of the planar tab extends between the pair of planar wings, wherein the collars, planar wings and planar tab provide an internal reinforcing framework for the dental prosthesis.

The at least one collar and the pair of planar wings may be monolithically formed.

The modular support may further include a curable polymer resin securing at least one collar to the respective connector, the resin substantially filling a space defined within the bore of the at least one collar and an outer surface of the respective connector located within the bore.

The one end of the planar tab may be permanently affixed to the pair of planar wings.

The planar tab may be permanently affixed to the pair of planar wings with a curable polymer resin.

A pair of vertically spaced planar wings may extend from each of at least two collars adjacent to one another, and wherein a first end of the planar tab extends between a first pair of planar wings, and a second end of the planar tab may extend between a second pair of planar wings.

Each of the plurality of connectors may include a bottom having a shape complementary to the upper profile of the respective abutment, and each connector may include a cylinder extending from the bottom toward the occlusal plane.

At least a pair of vertically spaced planar wings may extend from each of said plurality of collars substantially parallel to the occlusal plane, and the modular support may include a plurality of planar tabs extending substantially parallel to the occlusal plane, wherein each planar tab may include a first end sandwiched between a first pair of planar wings of a first of said collars, and a second end sandwiched between a second pair of planar wings of a second of said collars adjacent said first of said collars.

The plurality of connectors, the plurality of collars, the pair of planar wings, and the planar tab may be embedded within a dental prosthesis, the dental prosthesis including denture teeth and an acrylic resin.

The planar tab may include one or more lateral extensions extending from a side of the planar tab, the lateral extensions configured to provide additional surface area for reinforcing mechanical connection to a dental prosthesis when the modular support may be embedded within the dental prosthesis.

The planar tab may extend from at least one other collar, the planar tab extending substantially parallel to the occlusal plane, and said least one end of the planar tab may extend between the pair of planar wings of said at least one collar.

The at least one other collar and the planar tab may be monolithically formed.

The at least one collar may be configured for securement to a pair of immediately proximal dental implants, and wherein the at least one collar may include two bores, each bore receiving a respective connector of a respective abutment of the pair of immediately proximal dental implants.

The modular support may further include a vertical projection configured to provide reinforcing mechanical connection to a dental prosthesis when the modular support is embedded within the dental prosthesis, the vertical projection may extend through at least one planar tab.

The vertical projection may be permanently affixed to the at least one planar tab with a curable polymer resin.

The vertical projection may extend through the at least one end of the planar tab, and through the respective pair of planar wings.

The collar may be frustum having a frustoconical bore through which the respective connector extends, wherein the respective connector extends obliquely to the occlusal plane.

The cylinder may include at least one perpendicular fin, wherein the fin is configured to provide additional surface area for reinforcing mechanical connection with a curable polymer resin securing the body to the respective connector.

Another aspect of the present invention is directed to a method of forming a dental prosthesis for a patient, the patient having a plurality of dental implants, and each dental implant having an abutment. The method includes: releasably mounting a connector on each abutment; placing a collar about each connector, each collar having a bore that receives a respective connector, wherein at least one collar includes a pair of vertically spaced planar wings extending substantially parallel to an occlusal plane; positioning a planar tab substantially parallel to an occlusal plane with one end of the planar tab sandwiched between the vertically spaced planar wings; affixing the planar tab to the planar wings, and affixing the collars to the connectors, to form a modular support; releasing the modular support from the abutments; forming a dental prosthesis around the modular support; and releasably mounting the dental prosthesis, and modular support embedded therein, by remounting each connector on a respective abutment.

The planar tab and the planar wings may be affixed together with a curable resin, and the collars and respective connectors may be affixed together with the curable resin.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
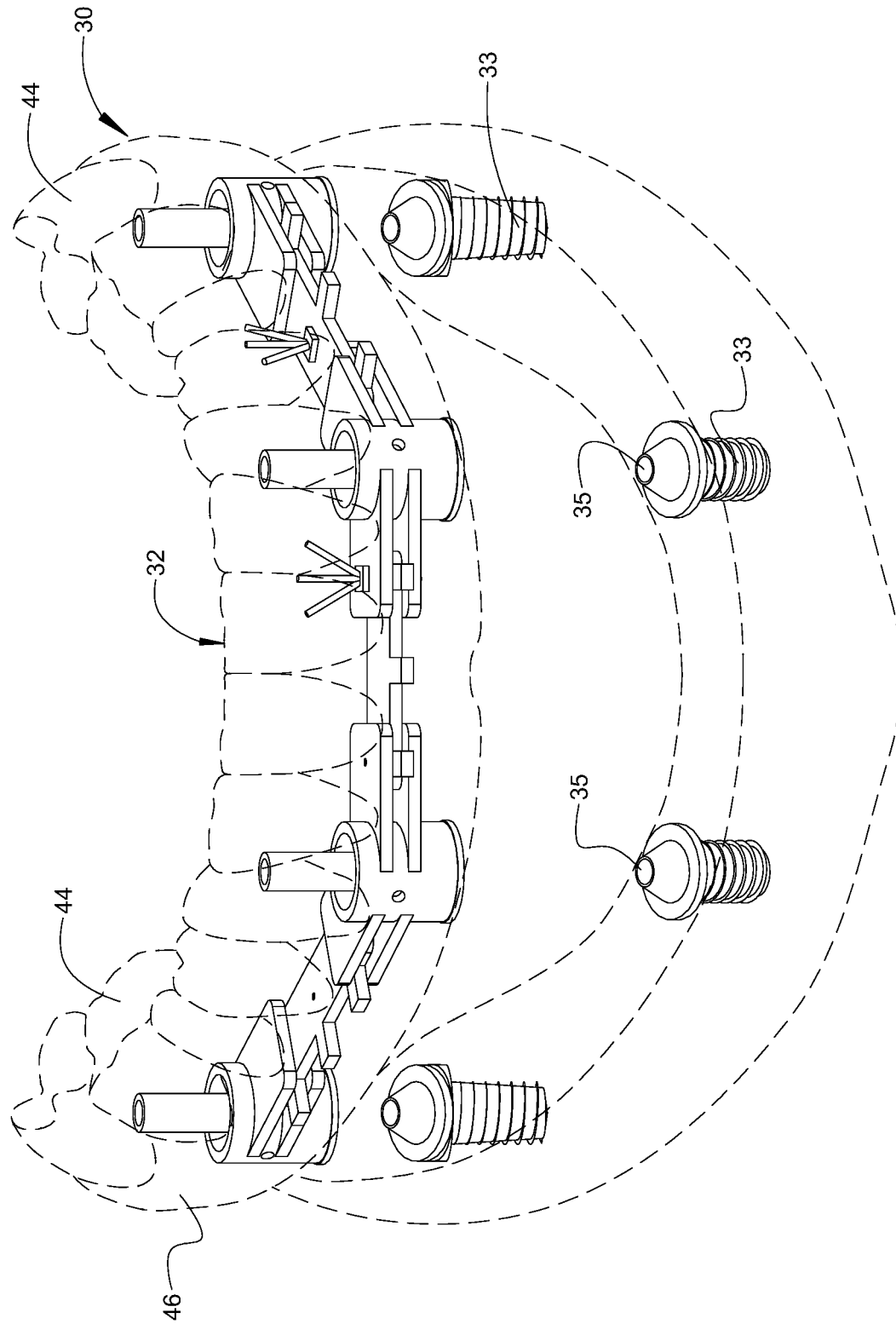
FIG. 1 is a front view of an exemplary modular support for dental prosthesis in accordance with various aspects of the present invention, the support shown within a dental prosthesis, and the corresponding dental implants shown within a lower jaw.
Figure 2:
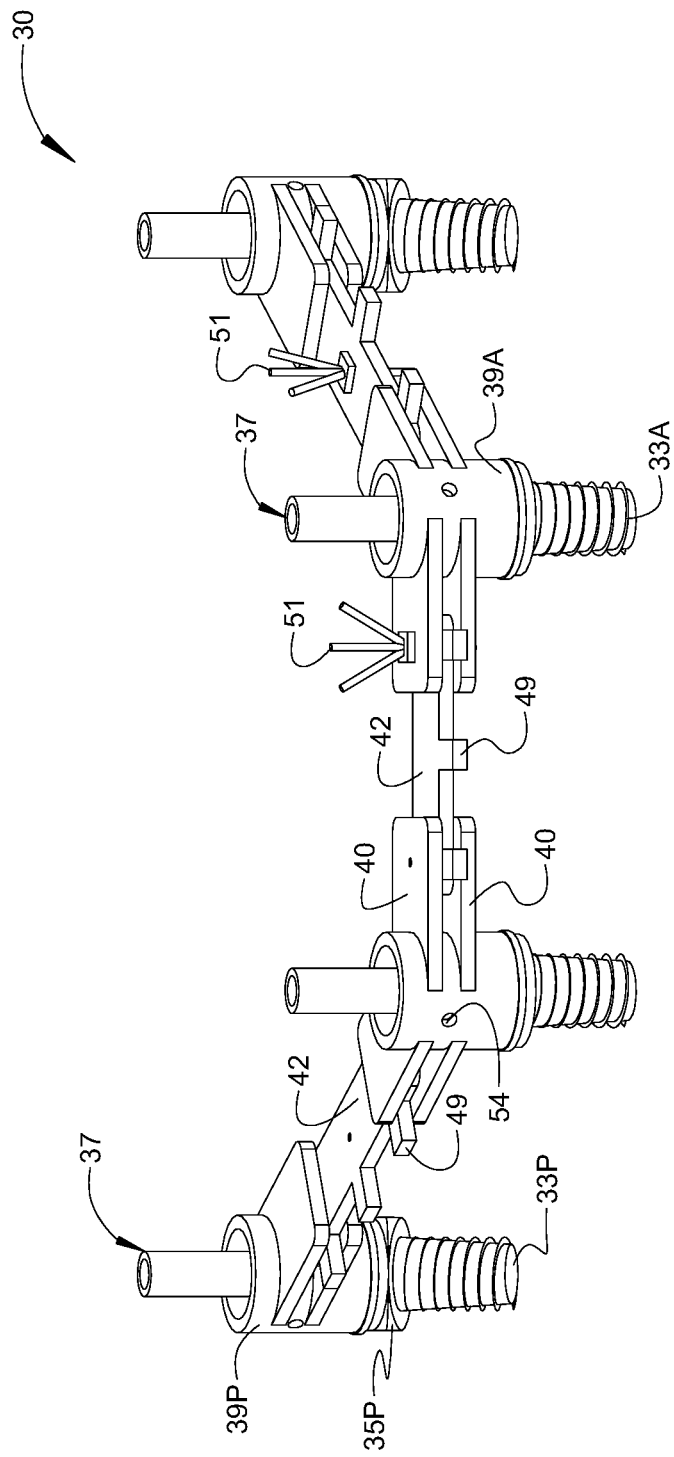
FIG. 2 is a front view of the modular support of FIG. 1 shown mounted on the corresponding dental implants.

Reference will now be made in detail to various embodiments of the present invention(s), examples of which are illustrated in the accompanying drawings and described below, wherein like components are designated by like reference numerals throughout the various drawings. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Turning now to FIG. 1 which shows an exemplary embodiment of a modular support 30 for a dental prosthesis 32. The modular support provides an assembly that serves as a reinforcing bar of the dental prosthesis. The modular support allows the masticatory forces subjected on the prosthesis to be distributed to several implants at once. Although four implants are shown, one will appreciate that a full-arch restoration may be supported on more or as few as three implants, and a bridge may be supported on two implants.

In accordance with various aspects of the present invention, modular support 30 provides an adjustable framework that can be custom fit, during a patient visit, for pre-existing or new dental implants. And the modular support provides an adjustable framework that can account for significant horizontal, vertical and angular misalignment of the dental implants, while achieving a precise and passive fit.

Modular support 30 is configured to releasably engage a plurality of dental implants 33 that have been surgically implanted into a patient's jawbone, either the mandible (lower jaw) or the maxilla (upper jaw). More specifically, the modular support is configured to releasably engage an abutment 35 of each dental implant, which abutment serves as a connecting element between the respective dental implant and the dental prosthesis 32. One will appreciate that abutments are well known, and many abutment manufactures have standardized shapes, sizes, and inclinations. For example, standard abutment inclinations may include 0°, 17°, and 30°, the latter of which is particularly useful for posterior implants which may be significantly angled to avoid the inferior alveolar nerve (see, e.g., implant 33P in FIG. 3).

Figure 4:
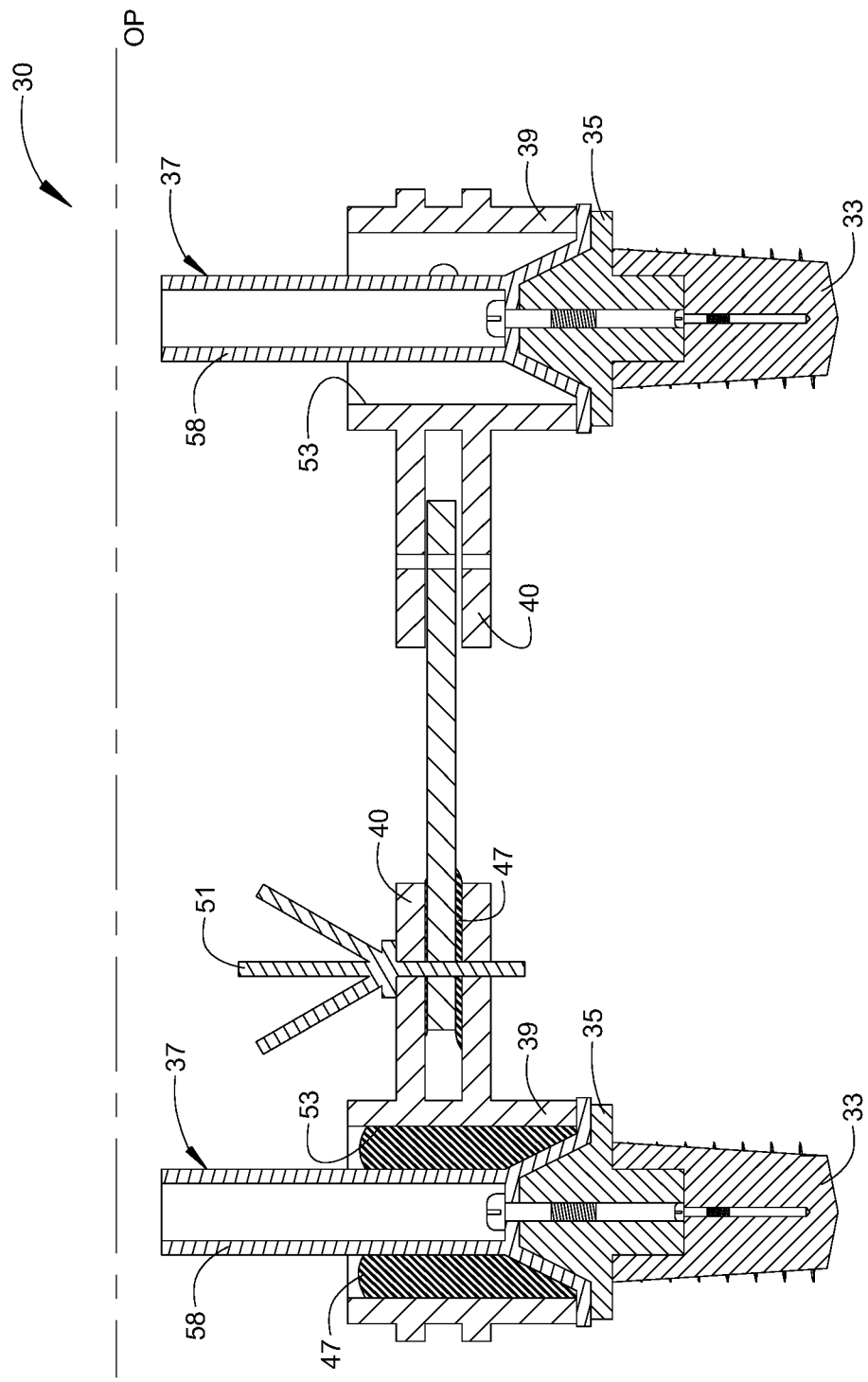
FIG. 4 is a cross-sectional view of the modular support mounted on the corresponding dental implants, taken along line 4-4 of FIG. 3.

As shown in FIG. 4, modular support 30 generally includes (i) connectors 37 for releasably engaging abutments 35, (ii) collars 39 which encircle and are ultimately affixed to the connectors, (iii) wings 40 that extend from the collars and sandwich (iv) the ends of tabs or bars 42 to form a framework that is ultimately embedded within a dental prosthesis to provide an internal reinforcing framework giving structural integrity to the dental prosthesis. As noted below, the wings may be monolithically formed with the collars, and various tabs or bars may be monolithically formed with the collars.

While a full-arch restoration is shown in FIG. 1, one will appreciate that the dental prosthesis may be a full-arch restoration, a partial-arch restoration, or even a bridge. Generally, the dental prosthesis includes denture teeth 44 and an acrylic resin base 46 that supports the teeth. The modular support may be embedded within the acrylic resin in an otherwise conventional manner.

Figure 3:
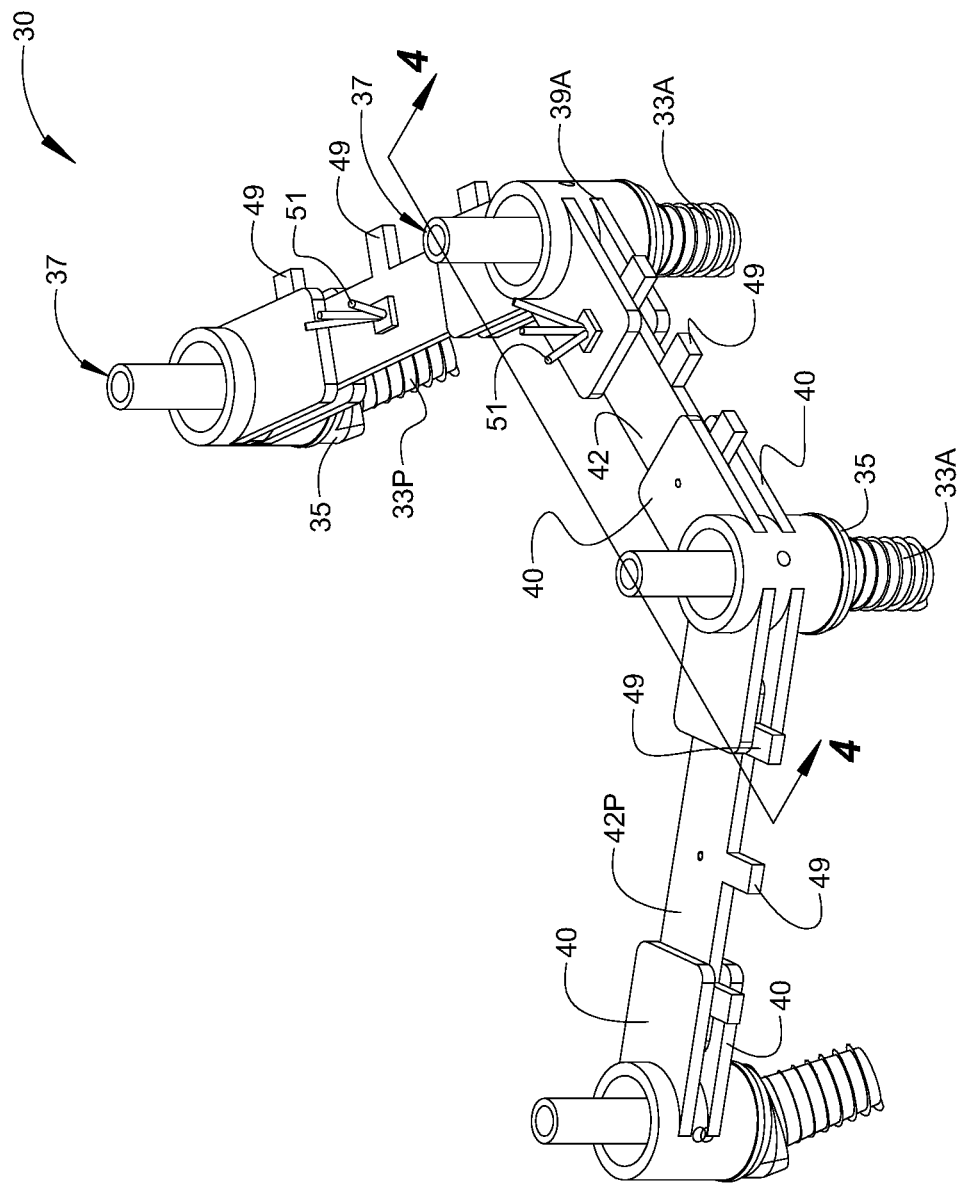
FIG. 3 is a perspective view of the modular support of FIG. 1 shown mounted on the corresponding dental implants.

In various embodiments, as shown in FIG. 3 and FIG. 4, each collar 39 may have a pair of vertically spaced planar wings 40 that extend substantially parallel to the occlusal plane. Wings extending from adjacent collars sandwich opposing ends of the planar tab 42 that extends between the adjacent collars. As can be seen, the tab also extends substantially parallel to the occlusal plane.

The overlapping planar configuration of the wings and tabs allows minor angular adjustment therebetween, thus allowing the collars to be readily aligned and positioned with their respective implants and abutments, regardless of where the implants may have been implanted.

The overlapping planar configuration of the wings and tabs also allows minor linear adjustment between adjacent collars, again allowing the collars to be readily aligned and positioned with their respective implants and abutments. For example, for closer abutments, the ends of a tab may be inserted more fully into the wings such that a greater proportion of the tabs are sandwiched by the wings. And if a tab proves too long to be placed between the wing pairs of adjacent collars, an oral surgeon, dentist, assistant or technician may cut or otherwise remove material from the tab to shorten its overall length in order to fit it between the adjacent wing pairs. Alternatively, tabs of varying length may be provided to accommodate the varying distance between implants and their corresponding collars and wing pairs.

Anterior collar 39A may include two pairs of wings extending at obtuse angles in order to accommodate anterior and posterior tabs 42, $42^P$, while posterior collar $39^P$ need only include one pair of wings to sandwich the posterior end of posterior tab 42P.

Figure 5:
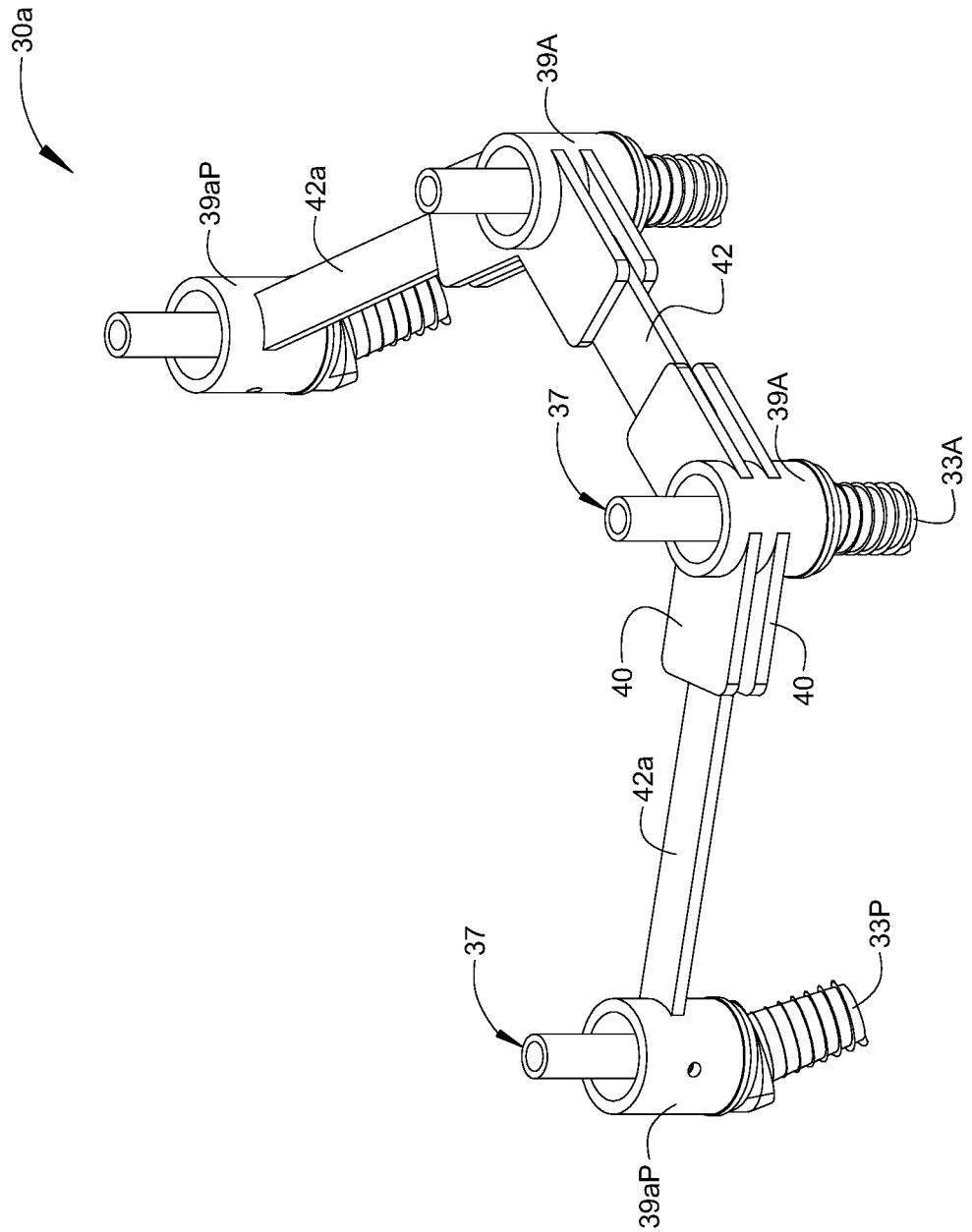
FIG. 5 is a front view of another exemplary modular support for dental prosthesis in accordance with various aspects of the present invention.

In other embodiments, as shown in FIG. 5, posterior collar 39aP may be provided with a tab 42a that extends substantially parallel to the occlusal plane. The remote end of tab 42a may be sandwiched between the pair of wings 40 of the adjacent collar 39A. The angular orientation and overlap between the tab and the pair of wings may be adjusted as necessary in manner similar to that discussed above.

One will appreciate that the collars may have other wing/tab configurations. For example, anterior collars may have a pair of wings and a tab, in which case the tab would extend at an obtuse angle relative to the wings. Alternatively, the collars may have sets of three or four wings extending substantially parallel to the occlusal plane to provide further framework for increased rigidity, in which case two or three tabs would be arranged in an overlapping manner between the wings.

Once the overlapping wings and tabs have been assembled and positioned such that the corresponding collars 39 are centered over their respective connectors 37, the wings and tabs may be affixed together by an adhesive, bonding agent, or other suitable means to form a rigid framework. Preferably, a preferably a curable polymeric resin 47 is used to affix the wings and tabs together, as shown in FIG. 4.

Preferably the collars and their respective wings and/or tabs are formed of titanium, stainless steel, or other suitable material that provides sufficient reinforcement for the dental prosthesis. One will appreciate that the collars and their respective wings may be monolithically formed by casting, 3D printing, milling, or other suitable fabrication process. Similarly, the collars and their respective tab may be monolithically formed by casting, 3D printing, milling, or other suitable fabrication process. Alternatively, the wings and tabs may be welded, soldered, brazed, bonded or otherwise rigidly attached to their respective collars.

As shown in FIG. 3, planar tabs 42 may include one or more lateral extensions 49 extending from a side of the planar tab. The lateral extensions have an additional surface area that provides further reinforced mechanical connection of modular support 30 to the acrylic resin of a dental prosthesis when the modular support is embedded within the dental prosthesis.

As also shown in FIG. 3, vertical projections 51 may also be provided to further reinforce the mechanical connection of modular support 30 to a dental prosthesis when the modular support is embedded within the dental prosthesis. As shown, the vertical projections may be trident shaped, however, one will appreciate that the vertical projections may take various geometric forms, including, but not limited to I-shaped, T-shaped, Y-shaped, etc.

The vertical projections may extend through a tab 42, or may extend through wings 40 and the tab sandwiched therebetween, thereby mechanically pinning the wings and tab together. Holes may be pre-drilled in the tabs and/or wings to receive the projections, or holes may be drilled at desired locations during the assembly process. Once in place, the projections may be affixed to the tabs and/or wings by suitable means. Preferably, a curable polymer resin 47 is used to affix the projections to the tabs and wings.

Once the framework of modular support 30 is assembled, that is, once the collars, wings, tabs and vertical projections (if used) are positioned such that the wing pairs and tabs overlap and the collars are aligned with a patient's abutments, the components may be affixed to one another with a curable polymer resin (or other suitable means) to form the rigid framework. Then, each collar 39 may be affixed to its corresponding connector 37 with a curable polymer resin while the connector is mounted on its corresponding abutment 35 and implant 33. Such in situ assembly allows for both a precise and a passive fit.

With reference to FIG. 4, each collar 39 includes a bore 53 extending substantially orthogonal to an occlusal plane OP. The bore is dimensioned to surround a respective connector 37 such that the space within bore surrounding the connector can be filled with an adhesive and/or bonding agent to permanently affix the collar and connector together. For example, while collar 39 is positioned in situ around connector 37 in a patient's mouth, bore 53 can be filled with a curable polymer resin 47 in order to affix the collar and connector together. The resin can be readily applied into the bore through the open top of the bore. And to better distribute the resin, the collars may be provided with application openings 54 in the side walls of the collars, as shown in FIG. 3 and FIG. 4.

One will appreciate, that misalignment of dental implants is not uncommon. In order to accommodate such misalignment, collars 39 may be provided with tapered walls 53' to accommodate up to several degrees of misalignment. In the illustrated embodiment, the bores are tapered from each end to provide an hour-glass shape, in which the tapered walls may be angled about 10-15°, and more preferably about 12° from the bore axis. As noted above, the modules are reversible and may simply be flipped 180° in order to orient the planar wings and/or slotted bars in their desired directions. The hour-glass shape is particularly well suited to accommodate for such reversibility.

In various embodiments, connector 37 includes a bottom 56 that has a shape complementary to the upper profile of the respective abutment 35 to which it is attached. For example, and as shown in FIG. 4, the bottom may have a conical shape that seats upon a complementary conical top of the respective abutment. The connector may include a cylinder 58 that extends from the bottom and into bore 53 of collar 39. In the illustrated embodiments, the cylinder extends through the bore, whereby the portion of cylinder extending out of the collar may provide additional reinforcement to the dental prosthetic modular support 30 is embedded within (see, e.g., FIG. 1).

Figure 6:
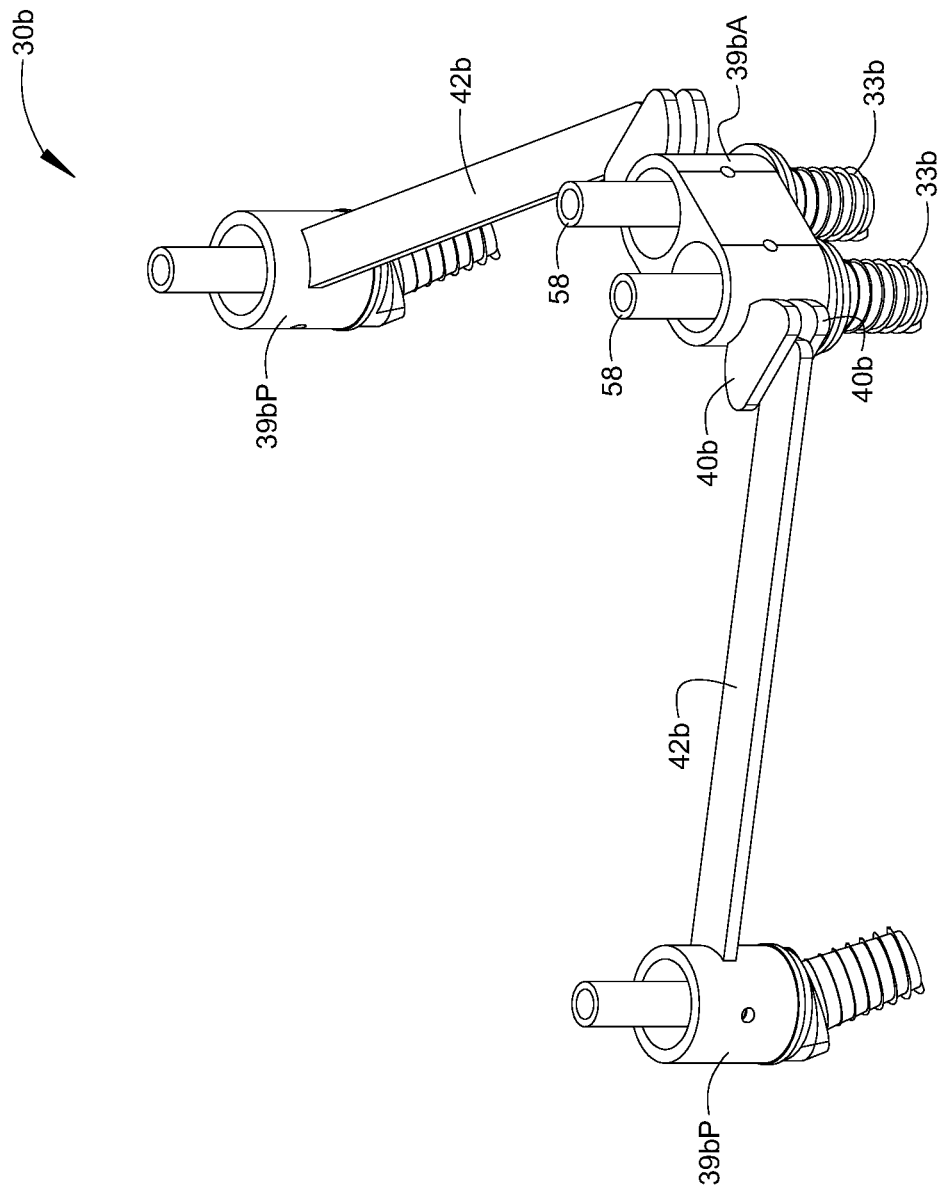
FIG. 6 is a front view of another exemplary modular support for dental prosthesis in accordance with various aspects of the present invention.

In various embodiments, adjacent implants 33b may have been implanted immediately proximal one another, as shown in FIG. 6. In such cases, the corresponding connector cylinders 58 might be too close to one another and preclude the use of two collars, that is, they may preclude the use of a separate collar for each cylinder. Accordingly, and in various embodiments, collar 39b may have two bores 53b, wherein each bore may receive a respective connector 37b of immediately the proximal dental implants.

Figure 7:
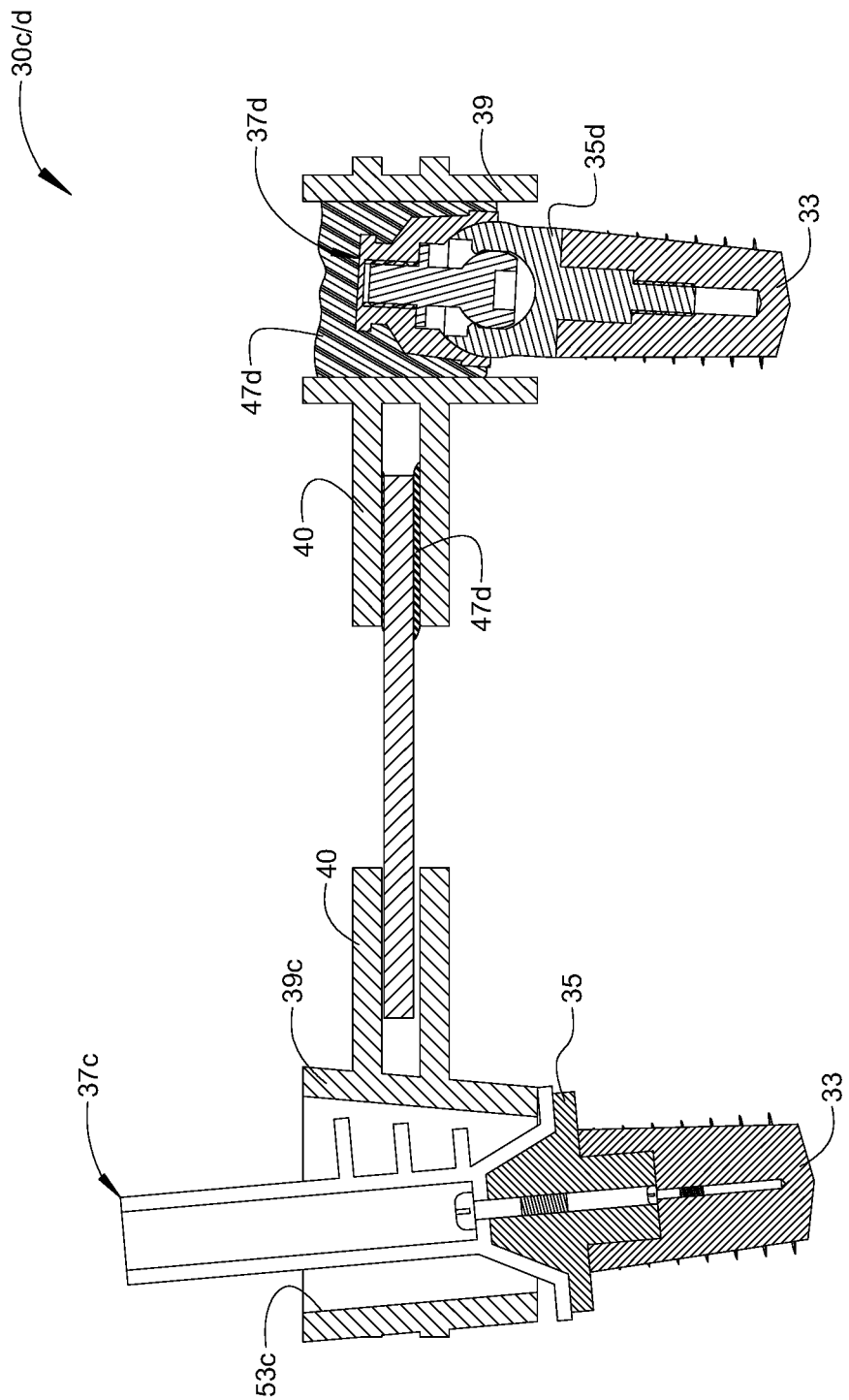
FIG. 7 is a cross-sectional view, similar to FIG. 4, of another exemplary modular support in accordance with various aspects of the present invention.

Preferably cylinder 58, along with the longitudinal axis of the upper profile of abutment 35, extends in a direction that is substantially orthogonal to the occlusal plane P, as shown in FIG. 4. One will appreciate, however, that misalignment of dental implants is not uncommon. In such cases, and when abutments of various inclinations cannot remedy the misalignment, cylinder 58 might extend obliquely to the occlusal plane, as shown in FIG. 7. In order to accommodate such misalignment, collar 39c may have the shape of a frustum, and cylinder 58c may include one or more eccentric fins 60, as shown in FIG. 7. The resulting frustoconical bore allows the collar to accommodate up to several degrees of misalignment, while the fins provide mechanical structure to fill the space within the frustoconical bore and provide further reinforcement and structural integrity to the curable polymeric resin or means that fills bore 53c to affix the collar and connector together.

In other embodiments, the connector 37d may have bottom 56d that has a complementarily shape to abutment 35d such that they form a ball-and-socket type interface to allow adjustable inclination in a manner similar to the LOCATOR F-TX® fixed attachment system provided by ZEST Anchors LLC of Carlsbad, Calif. Again, bore 53 is dimensioned to surround the respective connector 37d such that the space within the bore that surrounds the connector can be filled with a curable polymer resin 47 to affix the collar and connector together (see, e.g., FIG. 7).

One will appreciate that, the collars, wings and tabs may have various other configurations to provide a suitable modular support. For example, modular support 30e in FIG. 8 (shown without the corresponding implants, abutments or connectors) may be assembled from various modules selected from a kit, such as the assortment of modules shown in FIG. 9. The modules may include wing-wing modules WW, long wing-wing modules WW', wing-tab modules WT, long wing-tab modules WT', tab-tab modules TT, long tab-tab modules TT', straight anterior-bar modules AB, curved anterior-bar modules AB', distal-abutment modules DA, long distal-abutment modules DA', and/or various combinations of short or long wings 40e, 40e' and/or short or long tabs 42e, 42e' extending from a collar 39e.

Figure 8:
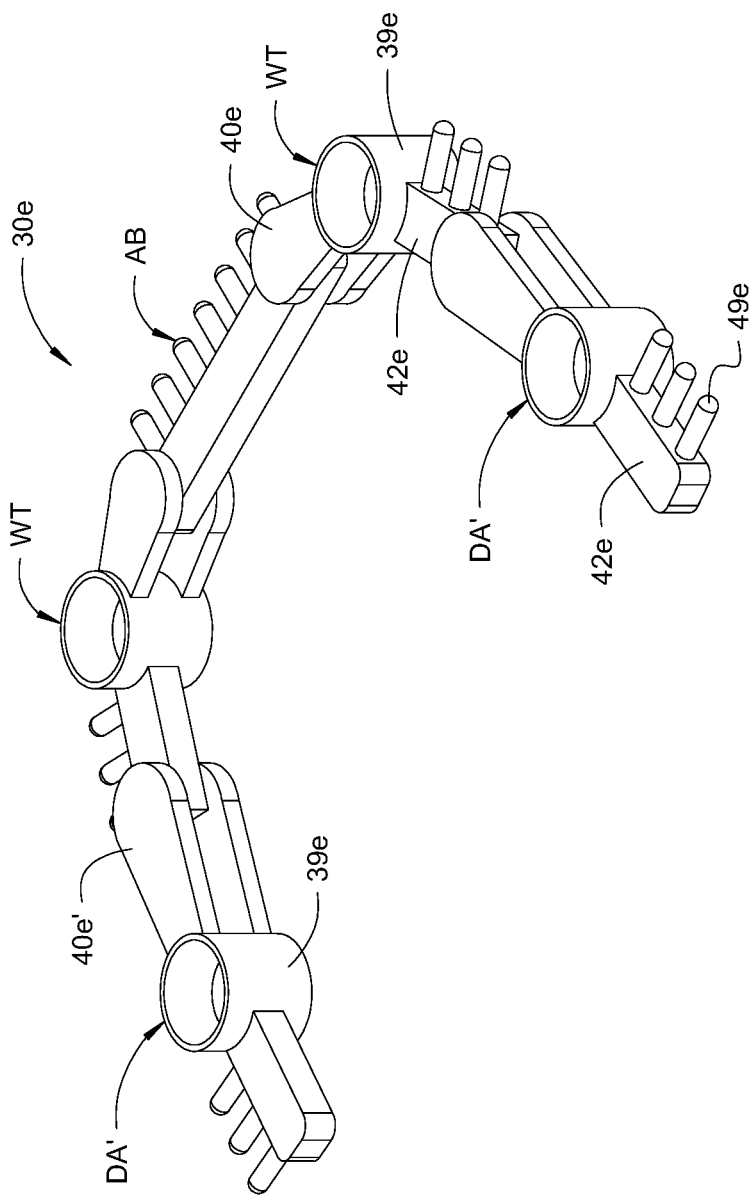
FIG. 8 is a perspective view of another exemplary modular support for dental prosthesis in accordance with various aspects of the present invention, the modular support shown without the corresponding implants.
Figure 9:
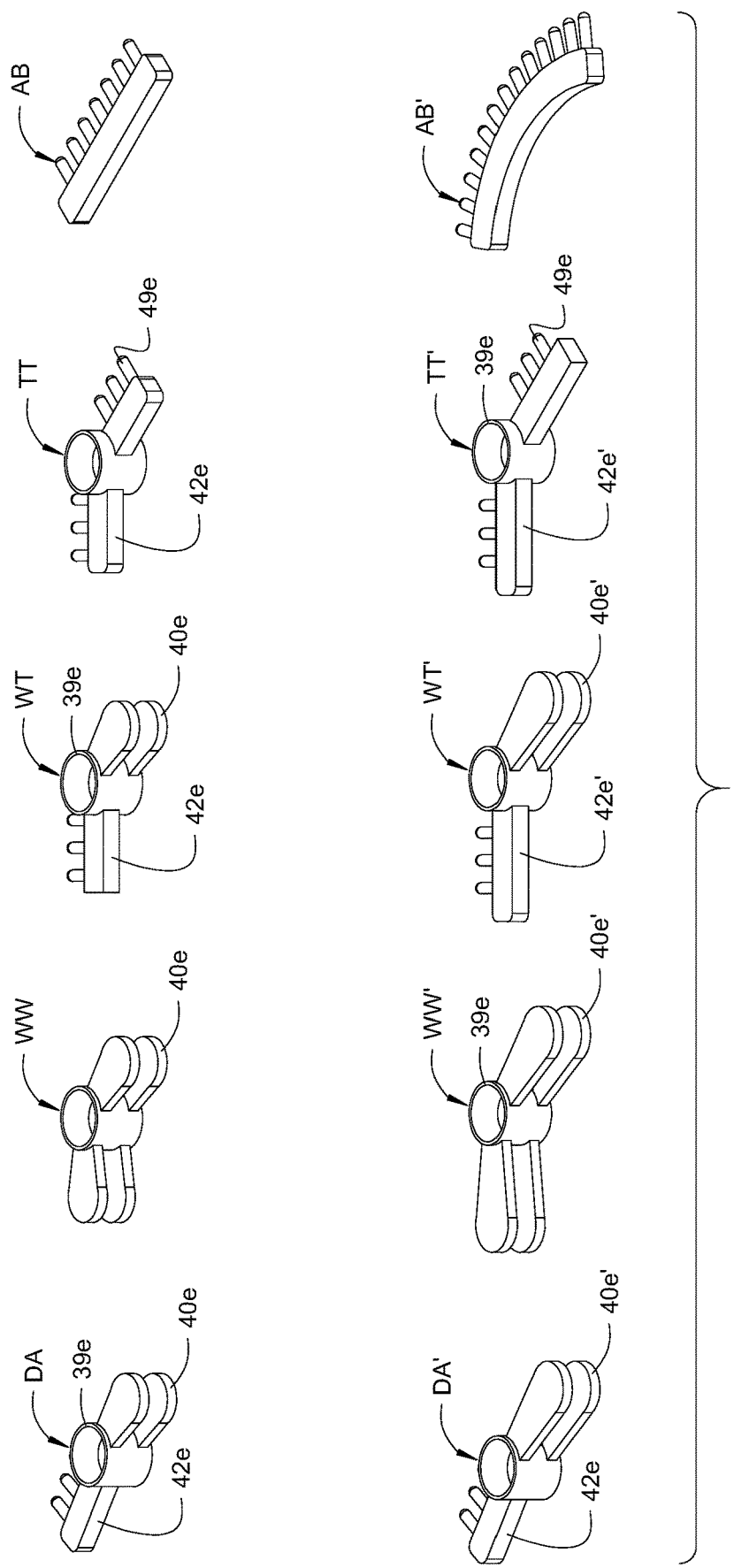
FIG. 9 is a perspective view of an assortment of modules of a modular-support kit used to construct the modular support of FIG. 8 and/or other similar modular supports, the support shown without it's corresponding implants.

As shown in FIG. 8 and FIG. 9, wings 40e, 40e' may have rounded ends which may provide for increased surface area overlapping with a corresponding tab regardless of the relative angle therebetween. As also shown, lateral extensions 49e may be cylindrical, and may have rounded ends, which configuration minimizes angled surfaces and may provide better mechanical connection between the modular support and the acrylic resin of the dental prosthesis.

An exemplary method of preparing a modular support in accordance with the present invention can now be described. Implants 33 are surgically mounted in a patient's jaw, and abutments 35 are mounted thereon in an otherwise conventional manner. The implants may be pre-existing (i.e., installed for an existing dental prosthesis or existing dental prostheses), or they may be surgically mounted specifically in preparation for a new dental prosthesis).

The appropriate connectors 37, collars 39 with wings 40, and tabs 42 may be provided (see, e.g., FIG. 3). Similarly, the appropriate connectors 37, collars 39A bearing wings 40, collars 39aP bearing tabs 42a, and tabs 42 may be provided (see, e.g., FIG. 5). One will appreciate that various collections of components may be provided as a kit available to the dental profession.

During a patient visit, connectors 37 may then be releasably mounted, in situ, on abutments 35. The connectors may be affixed to the abutments by screws (see FIG. 4), by a ball retainer (see FIG. 4, right side) or other suitable means.

Next, collars 39 may be placed about each connector 37, and the appropriate wings 40 and tabs 42 positioned with respect to one another such that they overlap.

Once the appropriate wings 40 and tabs 42 have a desired overlap, collars 39 may be centered about the respective connectors 37. A curable resin may then be applied to the wings and tabs in situ. Once the curable resin is applied, the collars, wings and tabs may be finely repositioned as necessary. And once the desired orientation is achieved, the curable resin may be cured (in an otherwise conventional manner) to affix the wings and tabs together thus creating a rigid framework. Alternatively, one will appreciate that one or more components may be disassembled such that the curable resin may be applied to the components outside of the patient's mouth, and then reassembled in the desired orientation, and then cured.

Once the framework is affixed, it may be positioned such that each collar 39 is properly centered over each connector 37. And once the desired orientation is achieved, a curable resin may be applied to fill bore 53 of each collar. Once the curable resin is applied, the collars may be finely repositioned as necessary. And once the desired positioning is achieved, the curable resin may be cured (in an otherwise conventional manner) to affix the collars to the respective connectors.

One will appreciate that the collars may be affixed to the connectors after the tabs and wings have been affixed, as described above, or the collars may be affixed to the connectors before the tabs and the wings have been affixed together.

Once the resin has cured affixing both the wings and tabs together, and the collars and connectors together, a rigid framework is created in the form of the modular support. Thus, modular support 30 can be removed from implants 33 by unscrewing connectors 37 from abutments 35 (see FIG. 4) or otherwise decoupled from the abutments (see, e.g., FIG. 7) and removed from the patient's mouth.

Next, modular support 30 may be embedded into dental prosthesis 32. For example, the dental prosthesis may be formed by applying acrylic resin 46 around the modular support and providing denture teeth in an otherwise conventional manner.

Once the dental prosthesis is completed (with the modular support therein), dental prosthesis 32 may be then returned to the patient's mouth and releasably mounted on the patient's abutments 35 of respective implants 33.

In accordance with various aspects of the present invention, modular support 30 and dental prosthesis 32 may be fabricated same day, thus reducing the number of patient visits and providing a commensurate reduction in costs.

For convenience in explanation and accurate definition in the appended claims, the terms "upper", "lower", etc. are used to describe features of the exemplary embodiments with reference to the positions of such features as displayed in the figures.

In many respects, various modified features of the various figures resemble those of preceding features and the same reference numerals followed by suffixes "a", "b", "c", and "d" designate corresponding parts. Certain features have reference numerals followed by the further suffixes "A" and "P", wherein the former designates "anterior", and the latter designates "posterior".

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A modular support for a dental prosthesis, the modular support configured for securement to a plurality of abutments, each engageable to a respective dental implant, said modular support comprising:
   a plurality of connectors, each connector releasably engageable to a respective abutment;
   a plurality of collars, each collar including a bore extending substantially orthogonal to an occlusal plane, wherein each collar surrounds a respective connector positioned in its bore;
   a pair of planar wings vertically spaced from one another and extending from at least one collar of the plurality of collars substantially parallel to the occlusal plane; and
   a planar tab extending substantially parallel to the occlusal plane, wherein at least one end of the planar tab extends between the pair of planar wings,
   wherein the collars, planar wings and planar tab provide an internal reinforcing framework for the dental prosthesis.

2. A modular support according to claim 1, wherein the at least one collar and the pair of planar wings are monolithically formed.

3. A modular support according to claim 1, further comprising a curable polymer resin securing at least one collar to the respective connector, the resin substantially filling a space defined within the bore of the at least one collar and an outer surface of the respective connector located within the bore.

4. A modular support according to claim 1, wherein the one end of the planar tab is permanently affixed to the pair of planar wings.

5. A modular support according to claim 4, wherein the planar tab is permanently affixed to the pair of planar wings with a curable polymer resin.

6. A modular support according to claim 1, wherein a pair of vertically spaced planar wings extend from each of at least two collars adjacent to one another, and wherein a first end of the planar tab extends between a first pair of planar wings, and a second end of the planar tab extends between a second pair of planar wings.

7. A modular support according to claim 1, wherein each of the plurality of connectors includes a bottom having a shape complementary to an upper profile of the respective abutment, and each connector including a cylinder extending from the bottom toward the occlusal plane.

8. A modular support according to claim 1, wherein at least a pair of vertically spaced planar wings extends from each of said plurality of collars substantially parallel to the occlusal plane, and the modular support includes a plurality of planar tabs extending substantially parallel to the occlusal plane, wherein each planar tab includes a first end sandwiched between a first pair of planar wings of a first of said collars, and a second end sandwiched between a second pair of planar wings of a second of said collars adjacent said first of said collars.

9. A modular support according to claim 1, wherein the plurality of connectors, the plurality of collars, the pair of planar wings, and the planar tab are embedded within a dental prosthesis, the dental prosthesis including denture teeth and an acrylic resin base.

10. A modular support according to claim 1, wherein the planar tab includes one or more lateral extensions extending from a side of the planar tab, the lateral extensions configured to provide additional surface area for reinforcing mechanical connection to a dental prosthesis when the modular support is embedded within the dental prosthesis.

11. A modular support according to claim 1, wherein the planar tab extends from at least one other collar of the plurality of collars, the planar tab extending substantially parallel to the occlusal plane, and said least one end of the planar tab extends between the pair of planar wings of said at least one collar.

12. A modular support according to claim 11, wherein said at least one other collar and the planar tab are monolithically formed.

13. A modular support according to claim 1, wherein said at least one collar is configured for securement to a pair of immediately proximal dental implants, and wherein said at least one collar includes two bores, each bore receiving a respective connector of a respective abutment of the pair of immediately proximal dental implants.

14. A modular support according to claim 1, further comprising a vertical projection configured to provide reinforcing mechanical connection to a dental prosthesis when the modular support is embedded within the dental prosthesis, the vertical projection extending through at least one planar tab.

15. A modular support according to claim 14, wherein the vertical projection is permanently affixed to the at least one planar tab with a curable polymer resin.

16. A modular support according to claim 14, wherein the vertical projection extends through the at least one end of the planar tab, and through the respective pair of planar wings.

17. A modular support according to claim 1, wherein the collar is frustum having a frustoconical bore through which the respective connector extends, wherein the respective connector extends obliquely to the occlusal plane.

18. A modular support according to claim 17, wherein the cylinder includes at least one perpendicular fin, wherein the fin is configured to provide additional surface area for reinforcing mechanical connection with a curable polymer resin securing the body to the respective connector.

19. A method of forming a dental prosthesis for a patient, the patient having a plurality of dental implants, and each dental implant having an abutment, the method comprising:
  releasably mounting a connector on each abutment;
  placing a collar about each connector, each collar having a bore that receives a respective connector, wherein at least one collar of the plurality of collars includes a pair of planar wings vertically spaced from one another and extending substantially parallel to an occlusal plane;
  positioning a planar tab substantially parallel to an occlusal plane with one end of the planar tab sandwiched between the vertically spaced planar wings;
  affixing the planar tab to the planar wings, and affixing the collars to the connectors, to form a modular support;
  releasing the modular support from the abutments;
  forming a dental prosthesis around the modular support; and
  releasably mounting the dental prosthesis, and modular support embedded therein, by remounting each connector on a respective abutment.

20. A method according to claim 19, wherein the planar tab and the planar wings are affixed together with a curable resin, and the collars and respective connectors are affixed together with the curable resin.

* * * * *